United States Patent [19]
Gove et al.

[11] Patent Number: 5,528,317
[45] Date of Patent: Jun. 18, 1996

[54] TIMING CIRCUIT FOR VIDEO DISPLAY HAVING A SPATIAL LIGHT MODULATOR

[75] Inventors: Robert J. Gove, Plano; Donald B. Doherty, Irving, both of Tex.

[73] Assignee: Texas Instruments Incorporated, Dallas, Tex.

[21] Appl. No.: 188,266

[22] Filed: Jan. 27, 1994

[51] Int. Cl.$^6$ .................................................... H04N 9/12
[52] U.S. Cl. .................. 348/743; 348/536; 348/514; 348/520
[58] Field of Search ...................... 348/786, 715, 348/718, 785, 743, 742, 744, 745, 756, 759, 760, 761, 781, 503, 513, 514, 520, 551, 808, 816, 196, 195, 199, 202, 536, 539; 345/186, 190, 185, 98, 200–202; H04N 9/12, 9/30, 9/31

[56] References Cited

U.S. PATENT DOCUMENTS

| | | | |
|---|---|---|---|
| 4,853,773 | 8/1989 | Hibino et al. | 348/503 |
| 5,006,928 | 4/1991 | Kawajiri et al. | 348/715 |
| 5,023,718 | 6/1991 | soloff | 348/715 |
| 5,172,221 | 12/1992 | Ko | 348/744 |
| 5,220,425 | 6/1993 | Enori et al. | 348/715 |
| 5,278,652 | 1/1994 | Urbanus et al. | 345/200 |
| 5,307,056 | 4/1994 | Urbanus | 345/200 |
| 5,327,229 | 7/1994 | Konno et al. | 348/743 |

FOREIGN PATENT DOCUMENTS 1262745 10/1985 U.S.S.R. ............... H04N 9/12
2132387 7/1984 United Kingdom ............... 358/58

OTHER PUBLICATIONS

T. J. Dennis, B. A., "Field–Sequential Colour Television Receiver." Wireless World, Sep. 1971, vol. 77, No. 1431, pp. 443–446.

Primary Examiner—Safet Metjahic
Attorney, Agent, or Firm—Julie L. Reed; James C. Kesterson; Richard L. Donaldson

[57] ABSTRACT

A method and apparatus for synchronizing display timing in a digital television system with a pixel addressable display having a color wheel is disclosed. The display timing circuit 22 includes phase comparator 40, for comparing the phase of a wheel index signal generated by a color wheel 20 with the phase of a frame synchronization signal indicating that a complete frame is ready to be displayed. Display timing circuit 22 further comprises a color wheel synchronization generator 42 which generates a color wheel synchronization signal in response to a phase difference value produced by phase comparator 40. The color wheel synchronization signal is used to increase, decrease, or maintain the speed of color wheel 20 to achieve a known phase relationship between the frame synchronization signal and the wheel index signal. Display timing circuit 22 further comprises a clock generator applicable to generate a display master clock signal having a known frequency relation to the wheel index signal.

15 Claims, 3 Drawing Sheets

TIMING CIRCUIT FOR VIDEO DISPLAY HAVING A SPATIAL LIGHT MODULATOR

TECHNICAL FIELD OF THE INVENTION

This invention relates to spatial light modulators, and more particularly to circuitry for controlling timing in a spatial light modulator display.

BACKGROUND OF THE INVENTION

One type of display used in digital image display systems, including digital television systems, is a spatial light modulator (SLM). A spatial light modulator consists of an array of electronically addressable pixel elements and related control circuits. A frequently used type of SLM is the digital micro-mirror device in which each pixel element is a tiny micro-mechanical mirror, capable of separate movement in response to an electrical input. Incident light may be modulated in direction, phase, or amplitude for reflection from each pixel.

In a typical application, the source of incident light is a light source filtered by a transparent color wheel composed of the three primary colors of light, red, green, and blue. This motor driven wheel rotates such that the light source is projected through each color segment during one rotation. Because pixel elements in an SLM are "binary" in the sense that they are either on or off, various pulse width modulation techniques may be used with the color wheel to display a color image. These techniques are described in pending U.S. Pat. No. 5,278,652 entitled, "DMD Architecture and Timing for Use in a Pulse Width Modulated Display System" assigned to Texas Instruments Incorporated. This application is incorporated by reference as if set forth fully herein. Because a color wheel contains the primary colors of light, a variety of colors may be displayed by displaying the appropriate primary colors for a required period of time.

A continuous video image, such as a television video signal, consists of a series of video frames. To properly display one frame of an image, the color wheel must make at least one rotation during each frame in a video image. To display the proper colors for a video image, a the rotation of the color wheel and the beginning of a video frame should be synchronized.

SUMMARY OF THE INVENTION

One aspect of the invention is a method of synchronizing display timing to a video signal, wherein a wheel index signal identifying the position of the color wheel is received along with a frame synchronization signal indicating that a complete video frame in the video signal is ready to be displayed. The phase of the wheel index signal is then compared with the phase of the frame synchronization signal and a color wheel synchronization signal is generated in response to this comparison. The color wheel synchronization signal is used to increase or decrease the speed of the color wheel to achieve a known phase relation with the frame synchronization signal. A display master clock signal that controls the transfer of data to the display is also generated. The display master clock signal also has a known phase relation to the wheel index signal.

A technical advantage of the present invention is that display timing is synchronized to the color wheel. Because display timing is tied directly to the position of the color wheel, the control of the color wheel is easier and less expensive. The color wheel motor does not need a high torque capacity as phase shifts can be performed gradually. Such gradual phase shifts are realizable due to the fact that the timing of the start of the display of a video frame is triggered by the wheel index signal which identifies the position of the wheel. This configuration eliminates the need for circuitry that produces precision phase and frequency control for the color wheel motor. In addition, the disclosed system produces minimal color distortion when a channel change occurs. By synchronizing timing between the color wheel and the output frames in a video signal, the disclosed system separates display timing from the timing functions required to process an input video signal and prepare that signal for output.

Another advantage of the disclosed invention is that timing circuity for an SLM can be designed to control SLMs with many different dimensions and SLMs that display different types of video signals.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention and its advantages are best understood by referring to FIGS. 1–7 of the drawings, like numerals being used for like and corresponding parts of the various drawings.

Figure 1:
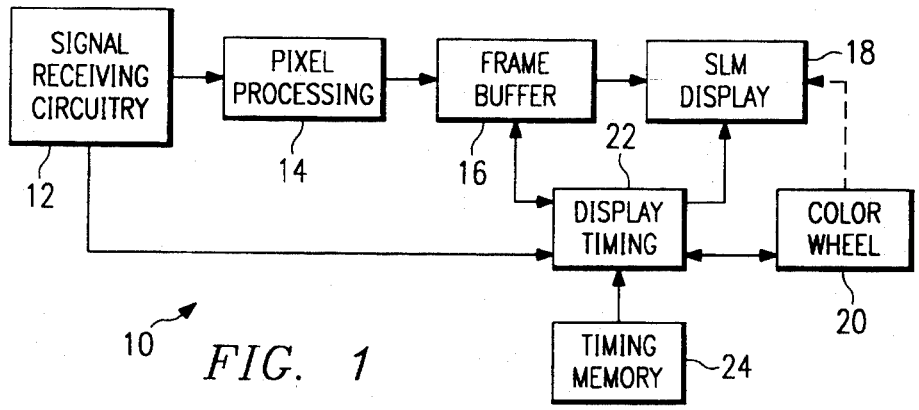
FIG. 1 illustrates a block diagram of a digital television system constructed according to the teachings of the present invention.

FIG. 1 illustrates a digital television system indicated generally at 10 and constructed according to the teachings of the present invention. Digital television system 10 can be constructed to allow the sampling and display of numerous types of video signals. For example, such a system can be constructed to receive and display one or more of the following types of video signals: National Television Standards Committee (NTSC), Phase Alternating Line (PAL), Sequential Color with Memory (SECAM), and Society of Motion Picture Engineers (SMPTE).

Signal receiving circuitry 12 may be constructed to receive one or more of these types of video signals. Signal receiving circuitry 12 separates the input video signal into its components and converts the signals to digital signals. Alternatively, signal receiving circuitry 12 could be constructed to receive video signals in digital form. Signal receiving circuity 12 could be constructed, for example, in accordance with the teachings of pending U.S. Pat. Ser. No. 08/147249, entitled "Digital Television System", assigned to Texas Instruments Incorporated, which is hereby incorporated by reference as if fully set forth herein. Signal receiving circuitry 12 produces a digitized version of the input signal in the form of input pixel data.

Pixel processing circuit 14 receives the input pixel data from signal receiving circuitry 12. Pixel processing circuit 14 may include circuitry capable of converting an interlaced video signal into a non-interlaced video signal, such as the circuitry disclosed in pending U.S. Pat. Ser. No. 08/002627, (Atty Dkt. No TI-17866) entitled "Frame Pixel Data Generation", assigned to Texas Instruments Incorporated, which is hereby incorporated by reference as if fully set forth herein. In addition, pixel processing circuitry 14 may perform various other processing tasks on the video pixel data produced by signal receiving circuitry 12. Such tasks include color space conversion, linearization of gamma corrected data, and picture control tasks such as sharpness, contrast, brightness, hue, and saturation. Pixel processing circuit 14 could also vertically scale an input video signal. After pixel processing circuit 14 has processed the input video pixel data, it feeds frames of output video pixel data into frame buffer 16.

Frame buffer 16 consists of memory capable of storing one or more complete video frames for display on the SLM. The video frames may be stored, for example, in frame buffer 16 as a set of bit-planes. For example, where the pixel data has an 8-bit per color format, the data can be stored as 24 bit-planes. Each bit plane corresponds to one bit of an eight bit value representing the intensity of one of the three primary colors of light. Because there are three eight-bit values, 24 bit planes are stored. Alternative forms of storage are readily imaginable and the pixel data could be stored as groups of bits, rather than as individual bit planes.

At the appropriate time, the output video pixel data stored in frame buffer 16 is transferred to spatial light modulator (SLM) 18 for display. SLM 18 can be a digital micro-mirror device (DMD) for example. As explained below in connection with FIGS. 2–7, color wheel 20 filters the light source (not shown) for SLM 18. Color wheel 20 projects the three primary colors of light—red, green, and blue to SLM 18, allowing SLM 18 to produce a color video image composed of a plurality of colors created by combining the primary colors of light supplied by color wheel 20.

Display timing circuit 22 receives a signal from color wheel 20 that indicates the position of the color wheel. In response to this signal, display timing circuit 22 controls the timing of transfers of output video pixel data from frame buffer 16 to SLM 18, the location in frame buffer 16 where the data is transferred from, the position on the SLM 18 where the output pixel data is displayed, and the timing necessary to display the data. Display timing circuit 22 receives a timing signal from signal receiving circuitry 12 with a frequency equivalent to the frequency that video frame lines are displayed on SLM display 18. Display timing circuit 22 receives a synchronization signal from frame buffer 16 indicating that a complete video frame has been transferred to frame buffer 16. The sequence of timing instructions needed to generate the addresses and timing signals necessary to display an entire frame of video data are stored in timing memory 24.

Figure 2:
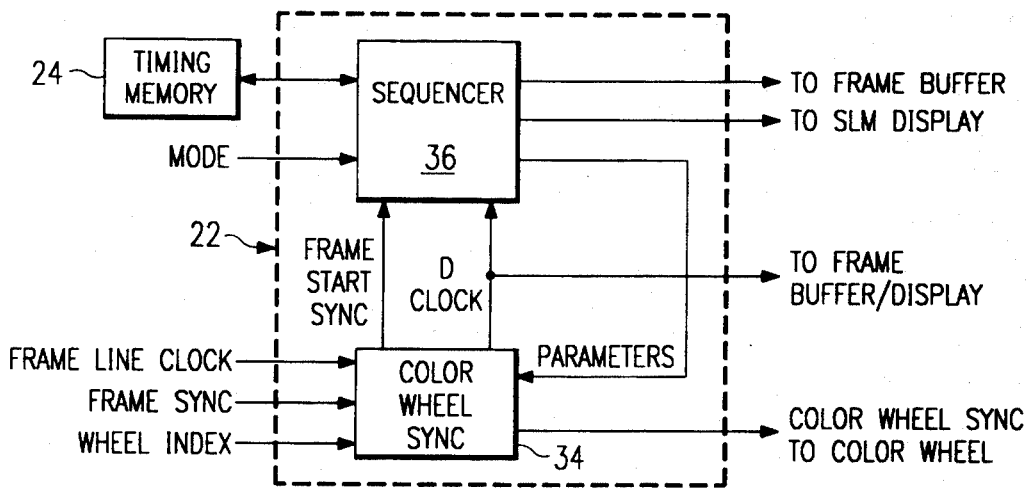
FIG. 2 illustrates a display timing circuit constructed in accordance with the teachings of the present invention.

FIG. 2 illustrates a display timing circuit 22 constructed in accordance with the teachings of the present invention.

Display timing circuit 22 comprises color wheel synchronization circuit 34 and sequencer 36.

Color wheel synchronization circuit 34 receives a frame line clock from signal receiving circuit 12 of FIG. 1, with a frequency equal to the rate at which each line of a video frame must be displayed. In addition, color wheel synchronization circuit 34 receives a frame synchronization signal indicating that an entire video frame has been transferred to frame buffer 16. The frame synchronization signal may be provided by signal processing circuit 14 or frame buffer 16. Color wheel synchronization circuit 34 also receives a wheel index signal indicating the position of color wheel 20.

In the disclosed embodiment, the wheel index signal indicates a known position of the color wheel. For example, the wheel index signal may indicate the beginning of the section of the color wheel that is colored green. Color wheel synchronization circuit 34 compares the phase of the wheel index signal with the phase of the frame synchronization signal and produces a phase difference value. The phase difference value is used to produce a color wheel synchronization signal. The color wheel synchronization signal is sent to color wheel 20 and controls the speed of color wheel 20 in order to achieve a known phase relation between the frame synchronization signal and the wheel index signal. In the embodiment illustrated in FIG. 2, the color wheel synchronization circuit 34 attempts to achieve relative phase equality between the frame synchronization signal and the wheel index signal. Other known phase relations however, can be readily imagined and could be produced by color wheel synchronization circuit 34 without departing from the teachings of the present invention.

Color wheel synchronization circuit 34 also generates a frame start synchronization signal which prompts sequencer 36 to begin executing the sequence of timing instructions necessary to display a complete video frame. Color wheel synchronization circuit 34 generates a display master clock or D-clock signal which has a known frequency relation with the wheel index signal so that the number of D-clock periods occurring between wheel index signals is driven to a predetermined constant. The D-clock signal also has a known phase relation with the wheel index signal. In the embodiment illustrated in FIG. 2 the display master clock signal has relative phase equality with the wheel index signal. The D-clock signal is used to control timing in sequencer 36, timing of the transfer of output pixel data from frame buffer 16 to SLM 18, as well as timing of the display of data on SLM 18. All of the timing signals required to achieve the transfer of output pixel data from frame buffer 16 to SLM 18 and to display the data in the appropriate position on SLM 18 at the appropriate time are provided by display timing circuit 22. Finally, color wheel synchronization circuit 34 receives parameters from sequencer 36. These parameters allow color wheel synchronization circuit 34 to be adapted to provide timing signals for different types of video signals and for SLMs with different dimensions. A specific embodiment of color wheel synchronization circuit 34 is described below in connection with FIG. 3.

Sequencer 36 is a specialized processor capable of providing the address and timing signals necessary to transfer frame output pixel data stored in frame buffer 16 to SLM 18. In addition, sequencer 36 is capable of generating the address and timing signals necessary to synchronize the acceptance by SLM 18 of output pixel data from frame buffer 16 and trigger the display of the output pixel data on SLM 18. Sequencer 36 also provides parameters to color wheel synchronization circuit 34 to calibrate it for a specific type of video signal and specific dimension of SLM.

Sequencer 36 executes a series of timing instructions stored in timing memory 24. Timing memory 24 can be preprogrammed to supply the timing sequences necessary for multiple types of video signals and for multiple SLMs having various dimensions. Sequencer 36 is capable of receiving a mode signal that indicates to the sequencer the type of video signal being displayed and the dimensions of the SLM display. Sequencer 36 may then execute the appropriate sequence stored in timing memory 24 in response to the mode signal. A specific embodiment of sequencer 36 is described below in connection with FIG. 4.

Display timing circuit 22 is capable of supporting different modes corresponding to different types of input video signals and different dimensions for SLM 18. Accordingly, the disclosed display timing circuit 32 has many advantages. For example, display timing is synchronized to color wheel 20, making the control of color wheel 20 easier and less expensive. Precise phase and frequency control are unnecessary as are high torque motors. Because the color wheel is, in turn, synchronized to a frame synchronization signal indicating that a video frame has been transferred to frame buffer 16, display timing becomes independent of the timing in the input video signal. Any discontinuity in input video timing, such as a change of channel, therefore, produces minimal color distortion on the display. In addition, display timing circuit 32 is programmable, allowing it to be used with different video signals and SLMs 18 with varied dimensions.

Figure 3:
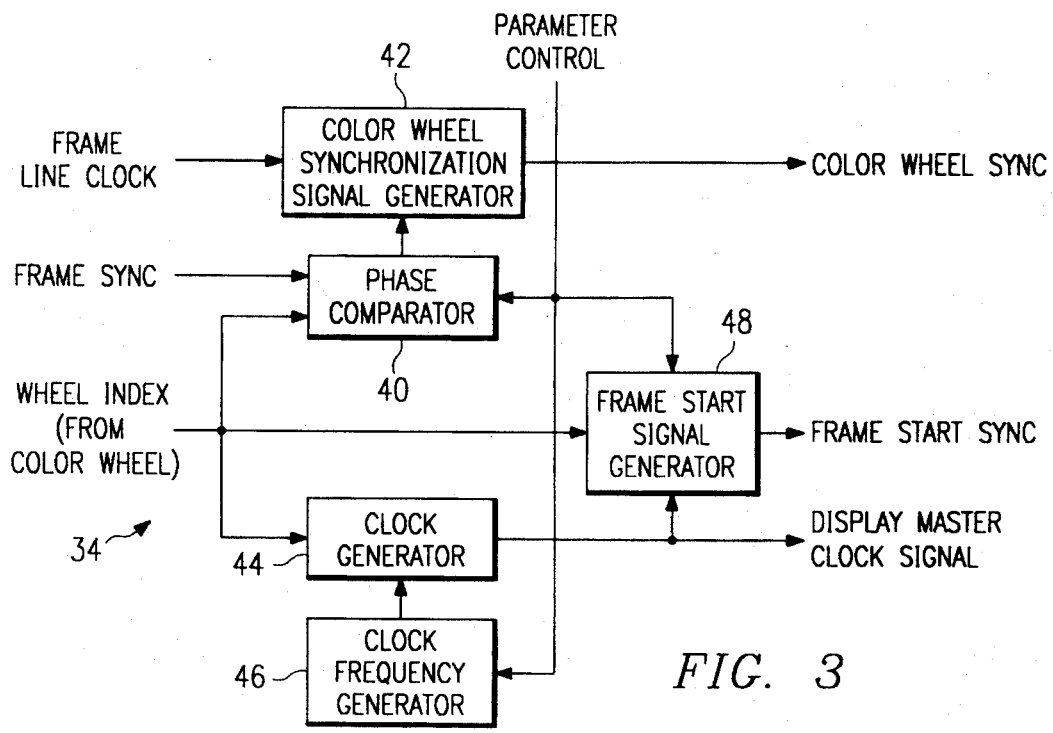
FIG. 3 illustrates an embodiment of a color wheel synchronization section of the digital timing circuit of FIG. 2 constructed according to the teachings of the present invention.

FIG. 3 illustrates one embodiment of a color wheel synchronization circuit 34. As illustrated in FIG. 3, color wheel synchronization circuit 34 comprises phase comparator 40, color wheel synchronization signal generator 42, clock generator 44, clock frequency generator 46, and frame start signal generator 48.

Phase comparator 40 receives the wheel index signal produced by color wheel 20. Phase comparator 40 also receives a frame synchronization signal indicating that an entire frame has been written into frame buffer 16. Phase comparator 40 compares the phase of the wheel index signal with the phase of the frame synchronization signal to produce a phase difference value. Color wheel synchronization signal generator 42 receives the phase difference value. Color wheel synchronization signal generator 42 generates a color wheel synchronization signal in response to the phase difference value to maintain, increase or decrease the speed of the color wheel, for the purpose of achieving a known phase relation between the frame synchronization signal and the wheel index signal.

In the preferred embodiment, color wheel synchronization signal generator 42 comprises a divide-by-N counter where N is the phase difference value supplied by phase comparator 40. The signal which is divided to produce the wheel synchronization signal is the frame line clock signal provided by signal receiving circuitry 12. In the preferred embodiment, the frame line clock has a frequency equal to the line rate for the output video signal. The line rate may be computed by determining the number of lines in an output video frame and multiplying the number of lines by the number of frames displayed per second.

In the embodiment illustrated in FIG. 3, phase comparator 40 provides three different phase difference values. First, when the phase of the frame synchronization signal is in the desired phase relation with the wheel index signal, the value of the phase difference value will be set to an optimal value. In addition, phase comparator 40 supplies a second phase difference value greater than the optimal value and a third phase difference value lesser than the optimal value. The optimal value will normally be the number of lines in the input video signal. For example, for an NTSC signal, the optimal phase difference value is 525, while the second and third phase difference values of N are 526 and 524. By dividing the frame line clock by the optimal value of 525, the resulting wheel synchronization signal has a frequency equal to the frequency of the frame synchronization signal.

If the frame synchronization signal and the wheel index signal have a phase difference indicating that the speed of color wheel 20 needs to be increased, phase comparator 40 supplies the lesser phase difference value to color wheel synchronization signal generator 42. If the frame synchronization signal and wheel index signal have a phase difference indicating that the speed of color wheel 20 needs to be decreased, phase comparator 40 supplies the greater phase difference value to color wheel synchronization signal generator 42. For the NTSC example, a value of 524 is provided to color wheel synchronization signal generator 42 to speed up the wheel, while a value of 526 is provided to color wheel synchronization signal generator 42 to slow down the wheel.

Phase comparator 40 may receive parameters from sequencer 36, the parameters consisting of the three phase difference values. Without departing from the teachings of the present invention, more phase difference values could be supplied to color wheel synchronization signal generator 42 by phase comparator 40 in response to varying phase differences between the frame synchronization signal and the wheel index signal. For example, five different phase difference values could be used, including an optimal value, two lesser values, and two greater values. These values could increase or decrease the speed of color wheel 20 by a greater or lesser amount depending upon the magnitude of the phase difference.

Color wheel synchronization circuit 34 also includes clock generator 44 which generates a display master clock signal having a known frequency and phase relation to the wheel index signal. In the embodiment illustrated in FIG. 3, the known phase relation is relative phase equality and the number of D-clock periods occurring between wheel index signals is driven to a predetermined constant. Clock generator 44 comprises a phase-locked loop that locks the phase of the wheel index signal received from color wheel 20 to a clock signal produced by clock frequency generator 46. Clock frequency generator 46 may be programmed by sequencer 36 to provide varying frequencies depending upon the requirements of SLM 18. The display master clock signal produced by clock generator 44 will have a known phase relation to the wheel index signal and will have a frequency equal to the frequency of the signal generated by clock frequency generator 46. The display master clock signal produced by clock generator 44 is used by sequencer 36 to synchronize all timing operations, by frame buffer 16 to synchronize the transfer of output pixel data to SLM 18, and by SLM 18 to synchronize the display of the output pixel data.

Color wheel synchronization circuit 34 also includes frame start signal generator 48. Frame start signal generator 48 generates a frame start synchronization signal to trigger the start of a display sequence by sequencer 36. Frame start signal generator 48 consists of a delay counter that counts a specific number of clock cycles of the display master clock signal after a wheel index pulse is received. The amount of delay depends upon the structure of frame buffer 16 and the requirements of SLM 18. Like other parameters that may vary with the type of input or SLM dimensions signal, the delay can be programmed by sequencer 36.

Because a frame is displayed based upon the receipt of the frame start synchronization signal, that is, in turn, controlled by the wheel index signal, the display of data on SLM 18 is synchronized to the position of color wheel 20. This arrangement allows the sequencer to begin displaying a video frame precisely when the color wheel is in the correct position.

Figure 4:
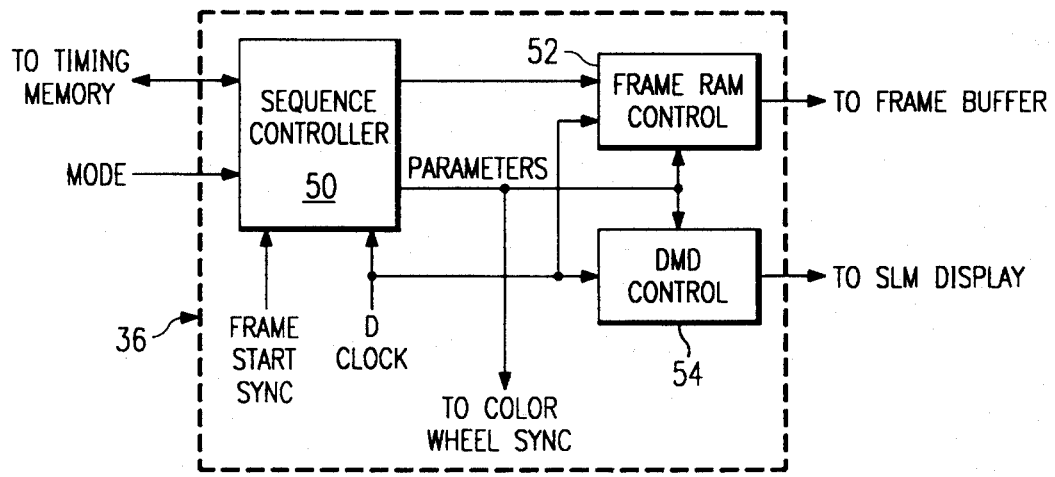
FIG. 4 illustrates the sequencer section of the digital timing circuit of FIG. 2 constructed according to the teachings of the present invention.

FIG. 4 illustrates one embodiment of sequencer 36. Sequencer 36 comprises sequence controller 50, frame ram control circuit 52 and DMD control circuit 54.

Sequence controller 50 comprises a processor operable to execute a timing sequence stored in timing memory 24 of FIG. 1. Sequence controller 50 determines which sequence of timing instructions to execute based upon a mode input. The mode input indicates the type of video signal to be displayed and the dimensions of SLM 18. The sequence of timing instructions executed by sequence controller 50 consists of a series of instructions to load specific segments of a video frame from frame buffer 16 to SLM 18 and instructions as to the duration that the data should be displayed on SLM 18. A segment consists of the specific portion of a video frame that is displayed on SLM 18 during a specific period. For example, a segment may consist of a bit plane or part of a bit plane. Sequence controller 50 executes the sequence of instructions necessary to display an entire frame of data stored in frame buffer 16 on SLM 18 in response to the frame start synchronization signal generated by color wheel synchronization circuit 34.

The display master clock generated by color wheel synchronization circuit 34 controls the timing of all functions performed by sequence controller 50. When display timing circuit 22 is first powered up, or when the mode signal inputs to sequence controller 50 change, sequence controller 50 supplies parameters to frame ram control circuit 52, DMD control circuit 54, and color wheel synchronization circuit 34. These parameters allow the display of a specific type of video signal on an SLM 18 with specific dimensions.

Sequence controller 50 indicates the segment of the output video frame to display and provides this information to frame ram control circuit 52 and DMD control circuit 54. Sequence controller 50 also provides a signal to frame ram control circuit 52 and DMD control circuit 54 to indicate to these circuits that a new segment should be displayed. This signal, called a segment start signal, triggers frame ram control circuit 52 and DMD control circuit 54 to proceed through a series of states necessary to display the corresponding segment on SLM 18.

Frame ram control circuit 52, upon receipt of the segment start signal, takes the segment number provided by sequence controller 50 and identifies the address in frame buffer 16 where the first portion of data in this segment can be found. Frame ram control circuit 52 then generates address signals to frame buffer 16 along with the timing signals necessary to read the data stored at the provided address. Frame ram control circuit 52 proceeds to calculate the address in frame buffer 16 of each portion of the segment to be displayed and generates the address and timing signals required to accomplish a read from frame buffer 16 for each address generated. When all of the addresses have been generated, frame ram control circuit 52 ceases operation until it receives a new segment start signal from sequence controller 50. As described below, the parameters necessary to configure frame ram control circuit 52 to a specific display for a specific video signal can be programmed by sequence controller 50.

Sequence controller 50 also provides a segment address signal and segment start signal to DMD control circuit 54. DMD control circuit 54 generates the address and timing signals necessary to display the output pixel data read from frame buffer 16 on SLM 18. DMD control circuit 54 is synchronized to frame ram control circuit 52 by the display master clock and the segment start signal. Accordingly, when frame ram control circuit 52 generates the address and control information necessary to read the first line of data from frame buffer 16, DMD control circuit 54 generates the address and control signals for SLM 18 necessary to accept the data. In addition, DMD control circuit 54 can be constructed to generate the signal used to trigger the display of the data transferred to SLM 18. For example, in a DMD-type SLM, DMD control circuit 54 can be designed to provide the reset line signals required to display data on an SLM, as described in Texas Instruments application 17,333.

Figure 7:
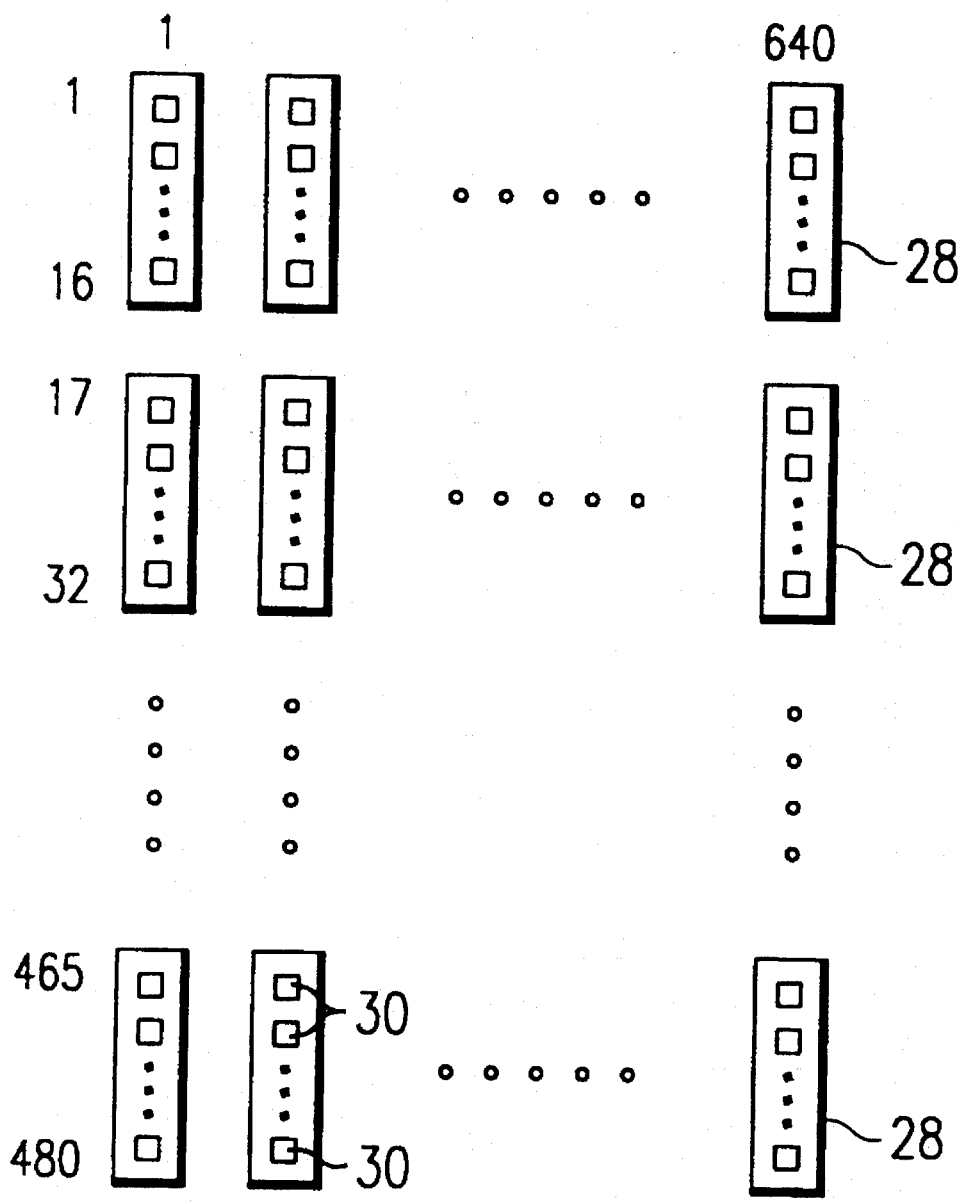
FIG. 7 illustrates an example of an SLM display which is capable of displaying standard NTSC television signals and can be used with the present invention.

The operation of sequencer 36 can be most easily understood by describing its operation with SLM 18 illustrated in FIG. 7.

FIG. 7 illustrates one type of SLM for the display of an NTSC television signal. For purposes of this description, an image having 480 rows, and sampled for 640 pixels per row from an NTSC signal is assumed. Thus, SLM 18 has an array of at least 640×480 pixel elements.

The SLM 18 illustrated in FIG. 7 is a digital micro-mirror device (DMD), such as that manufactured by Texas Instruments Inc. It is configured for "split reset" operation, which reduces the number of memory cells. Here, the DMD is divided into blocks of 16 mirror elements and a single memory cell 28. During each reset period, 1 pixel element 30 of each block 28 displays 1-bit of data. The result is that each reset segment is 1/16 of a bit-plane. The disclosed display timing circuit 22 is not limited to use with a DMD for SLM 18 but may be used with other types of SLMs having addressable pixel elements. Each micro-mechanical mirror element reflects light for one pixel of the display and may be modulated to provide the varying intensity of light needed to display an image.

SLM 18 consists of 640 columns of DMD blocks 28. In each column, there are 30 blocks 28. As a result, SLM 18 has 640 columns of pixels and 480 rows of pixels as each block 28 has 16 micro-mechanical mirror elements 30.

Each block 28 has one memory cell. As a result, only 1 of 16 of the micro-mechanical mirror elements 30 may change position at any one time. The position of the micro-mechanical mirror elements 30 are controlled by 16 reset lines (not shown) in each DMD element 28. In the embodiment of SLM 18 shown in FIG. 7, the corresponding reset lines in each DMD element 28 are tied together, forming 16 reset segments. As a result, 30 complete rows of SLM 18 are controlled simultaneously. For example, rows 1, 17, 33, . . . 449, 465 are all controlled simultaneously as one segment. Segment two consists of rows 2, 18, 34 . . . 448, 466. The details of controlling an SLM 18 such as that illustrated in FIG. 7 are described in pending U.S. patent application Ser. No. 08/002627, entitled "Pixel Control Circuitry for Spatial Light Modulator", assigned to Texas Instruments Incorporated, which is hereby incorporated by reference as if fully set forth herein. In the SLM 18 illustrated in FIG. 7, the data for 30 rows of pixels is loaded into the memory cells. After all the data has been loaded, the appropriate reset line is activated, thereby controlling the proper micro-mechanical mirror element in each DMD element 28. Because 30 rows are written to at any one time, the memory cell for every DMD element 28 is loaded no matter which of the 16 groups of rows are displayed.

The embodiment of SLM 18 is only one example of the type of SLM 18 that could be used with the disclosed display timing circuit 22. Alternatively, different types of DMD elements 28 could be used. The DMD blocks 28 could also be arranged horizontally or diagonally.

Each micro-mechanical mirror element 30 is pulse-width modulated to achieve the proper color and intensity of a pixel. For example, these elements may be modulated as described in pending U.S. Pat. No. 5,278,652, entitled "Fault Tolerant DMD Addressing", assigned to Texas Instruments Incorporated. In the embodiment illustrated in FIG. 7, SLM 18 displays 24 bit planes for each frame of video data. Each output video signal consists of an 8-bit value for each pixel for each of the colors on color wheel 20—red, green and blue. Thus, each pixel displayed on SLM 18 is formed by combining three 8 bit values corresponding to the colors on color wheel 20. These three 8-bit values account for the 24 bit planes which must be displayed for each video frame. Each bit of each color is displayed individually. In accordance with the pulse width modulation scheme, the length of time that a particular bit plane is displayed depends upon the relative bit-weight represented by that bit plane.

Sequence controller 50, then, executes a sequence of timing instructions stored in timing memory 24. These instructions cause sequence controller 50 to generate, for example, a segment number that identifies the segment to display on SLM 18 and a signal indicating the duration that this segment should be displayed. For the embodiment of SLM 18 illustrated in FIG. 7, the segment number may consist of a reset group number and a bit plane number. The bit plane number identifies which of 24 bit planes need to be displayed while the reset group number indicates which segment of SLM 18 currently needs to be displayed.

Frame ram control circuit 52 generates an address in frame buffer 16 at which the first line for the specific reset group and bit plane number is located. Frame ram control circuit 52 sends this address to frame buffer 16 along with control signals necessary to cause the data to be read from frame buffer 16. At the same time, DMD control circuit 54 generates the address of the blocks 28 where the data read from frame buffer 16 is to be transferred to SLM 18. In the example illustrated in FIG. 7, the first line of data transferred from frame buffer 16 to SLM 18 will normally be transferred to the row of blocks 28 corresponding to pixel rows 1–16.

After the first line of data has been transferred, frame ram control circuit 52 generates a second address for the transfer of the next line. At the same time, DMD control circuit 54 generates the address corresponding to location in SLM 18 where the data read from frame buffer 16 is to be transferred, along with timing signals to control the transfer. This process continues until each line in a segment has been transferred from frame buffer 16 to SLM 18.

After each line has been transferred, DMD control 54 may trigger SLM 18 to display the segment of pixel data transferred from frame buffer 16. For SLM 18 illustrated in FIG. 7, the DMD control circuit may include circuitry to generate the signals controlling the reset lines on DMD element 28. Alternatively, DMD control circuit 54 could simply provide a signal indicating that pixel data for a segment has been transferred from frame buffer 16 to SLM 18 and external circuitry could control the reset lines. In addition, DMD control circuit 54 could provide a signal indicating which reset line to trigger. The signal indicating that a transfer is complete could also have a duration equal to the duration that the reset line should be activated.

After an entire segment has been transferred from frame buffer 16 to SLM 18 and that segment has been displayed on SLM 18, the sequencer provides a new segment number to frame ram control circuit 52 and DMD control circuit 54. This process continues, until a complete video frame has been displayed on SLM 18. After a complete frame has been displayed, sequence controller 50 will begin the sequence again after receipt of a new frame start synchronization signal.

Figure 5:
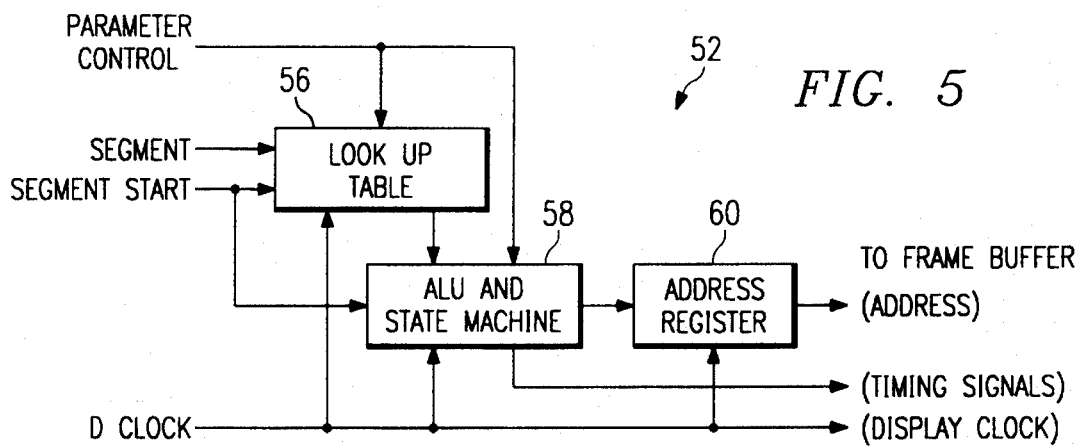
FIG. 5 illustrates the frame ram control section of the sequencer illustrated in FIG. 4 and constructed according to the teachings of the present invention.

FIG. 5 illustrates a frame ram control circuit 52 constructed in accordance with the present invention. Frame ram control circuit 52 comprises look-up table 56, ALU and state machine 58 and address register 60.

Look-up table 56 receives the segment number from sequence controller 50. The segment start signal enables a read from the look-up table. Look-up table 56 converts the segment number into an absolute address of the location of the start of the desired segment in frame buffer 16. Look-up table 56 is programmed by sequence controller 50 upon start up. This allows display timing circuit 36 to be configured for many different types of memory structures for frame buffer 16. Look-up table 56 provides the initial address to ALU and state machine 58.

ALU and state machine 58 generates the address and timing signals sent to frame buffer 16. The state machine is synchronized to the display master clock and produces timing signals synchronized to that clock. After supplying the first address to frame buffer 16, ALU and state machine 58 calculates the next address by adding an offset to the starting address. Each subsequent address is computed by adding the same offset. The offset may be programmed by sequence controller 50 on start up.

Address register 60 simply stores the address information produced by ALU and state machine 58. Address register 60 supplies the appropriate address to frame buffer 16. In the embodiment illustrated in FIG. 5, address register 60 is a serial shift register which can be used with a frame buffer allowing read operations with serially generated addresses.

In operation, then, frame ram control circuit 52 receives a signal from sequence controller 50 to initiate the transfer of a specific segment from frame buffer 16 to SLM 18. The segment number is provided to look-up table 56 which generates the absolute address of the first line in frame buffer 16 corresponding to the segment number. This address is provided by look-up table 56 upon receipt of the segment start signal generated by sequence controller 50. This address is provided by ALU and state machine 58 to address register 60. The address is supplied to frame buffer 16 along with timing signals generated by ALU and state machine 58, causing the first line of data in the segment to be read from frame buffer 16.

After the first line of data in a segment has been transferred from frame buffer 16 to SLM 18, the ALU and state machine 58 adds an offset to the starting address to compute the address of the second line of data in frame buffer 16. This second line of data is then read from frame buffer 16. This process continues until each line in a segment has been transferred from frame buffer 16 to SLM 18. ALU and state machine 58 also contains a parameter indicating the number of lines in the segment so that ALU and state machine knows exactly how many times to add the offset to the current address to generate a new address. Once all lines in a segment have been transferred, frame ram control circuit 52 waits until a new segment start signal is received from sequence controller 50.

Figure 6:
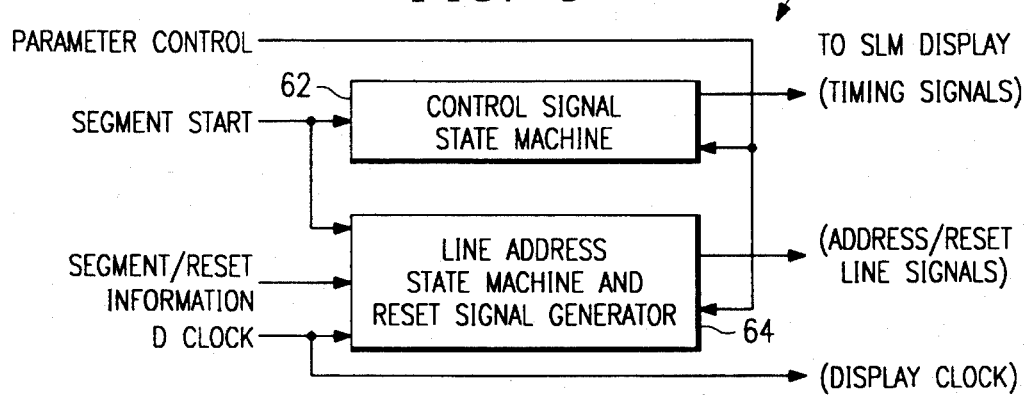
FIG. 6 illustrates the DMD control section of the sequencer illustrated in FIG. 4 and constructed according to the teachings of the present invention.

FIG. 6 illustrates an embodiment of DMD control circuit 54 made in accordance with the teachings of the present invention. DMD control circuit 54 comprises control signal state machine 62 and address and reset signal generator 64.

Control signal state machine 62 simply provides all of the control signals required to cause SLM 18 to receive output pixel data supplied by frame buffer 16. The duration of each of the signals may be controlled by parameters supplied by sequence controller 50 on start up or change of mode. The control signal state machine generates a set of timing signals for each transfer required to transfer an entire segment of output pixel data from frame buffer 16 to SLM 18. Control signal state machine 62 also includes a parameter indicating the number of such transfers for each segment. This parameter is also programmable by sequence controller 50. Control signal state machine 62 is synchronized by the segment start signal provided by sequence controller 50 and by the display master clock signal provided by color wheel synchronization circuit 34.

Address and reset signal generator 64 receives the segment number and a reset signal from sequence controller 50. The segment signal indicates which segment to display on SLM 18. The reset line signals may be derived from this segment information. In addition, address and reset signal generator 64 generates the reset line signals used to display data on SLM 18 after an entire segment has been transferred from frame buffer 16 to SLM 18. Address and reset signal generator 64 also generates the address of the location in SLM 18 to write the data upon transfer from frame buffer 16. In the embodiment illustrated in FIG. 6, address and reset signal generator 64 generates this address information merely by starting at one and incrementing to a number equaling the total number of lines in each segment. The final number generated by address and reset signal generator may be controlled by storing a parameter in address and reset signal generator 64 that was provided by sequence controller 50. After the maximum line number has been reached, address and reset signal generator 64 then generates the reset line signals required to display the transferred data on SLM 18.

In operation, DMD control circuit 54 receives a segment start signal from sequence controller 50. The segment start signal causes control signals to be generated by control signal state machine 62. A set of control signals is generated for each line that must be transferred from frame buffer 16 to SLM 18. The number of lines transferred corresponds to the number of lines contained in each segment. Address and reset signal generator 54 provides an address in SLM 18 at which each line transferred from frame buffer 16 should be stored in SLM 18. The address signal produced by address and reset signal generator 64 begins at one and increments by one for each new line transferred from frame buffer 16 to SLM 18. When the final line has been transferred, address and reset signal generator 64 generates the appropriate reset line signal corresponding to the particular segment being displayed and maintains the reset signals' duration for an appropriate time. This time corresponds to the reset duration information provided by sequence controller 50.

Accordingly, address and reset signal generator 64 simply provides address signals numbered 1–30 to SLM 18 to accomplish the display of a particular segment.

Although the present invention and its advantages have been described in detail, it should be understood that various changes, substitutions and alterations can be made therein without departing from the spirit and scope of the invention as defined by the appended claims.

What is claimed is:

1. A method of synchronizing display timing to pixel data representing a video signal comprising the steps of:

receiving a wheel index signal identifying the position of a color wheel;

receiving a frame synchronization signal indicating that a complete video frame of said pixel data is ready to be displayed;

comparing the phase of said wheel index signal with the phase of said frame synchronization signal;

generating a color wheel synchronization signal in response to said comparing step for increasing or decreasing the speed of said color wheel to achieve a known phase relation with said frame synchronization signal;

generating a display master clock signal that controls the transfer of said pixel data to a pixel addressable display, said display master clock signal having a known frequency relation to said wheel index signal; and generating a frame start synchronization signal indicating that the pixel addressable display should start displaying a next video frame, such that said synchronization signal is also used to generate a series of address and timing signals to cause a specific portion of said next video frame to be transferred to said pixel addressable display.

2. The method of claim 1, wherein said step of generating a color wheel synchronization signal is performed by dividing a line clock signal by an integer, the line clock signal being derived from the video line rate of the video signal.

3. The method of claim 1, further comprising the step of displaying a video picture on the pixel addressable display in response to said display master clock signal.

4. The method of claim 1, wherein said step of generating a display master clock signal is accomplished by receiving a parameter to set the frequency of the display master clock.

5. The method of claim 1, wherein said display master clock signal generated by said step of generating a display master clock signal has a known phase relation of substantial phase equality with said wheel index signal.

6. The method of claim 1, further comprising the step of transferring the pixel data from a display memory to the pixel addressable display in response to said display master clock signal.

7. A display timing circuit for synchronizing display timing to a video signal in a digital television system having a pixel addressable display and a color wheel wherein the color wheel generates a wheel index signal identifying the position of the color wheel, comprising:

a phase comparator for comparing the phase of said wheel index signal with the phase of a frame synchronization signal indicating that a complete video frame in the video signal is ready to be displayed, thereby generating a phase difference value;

a color wheel synchronization signal generator for generating a color wheel synchronization signal in response to said phase difference value for increasing or decreasing the speed of the color wheel to achieve a known phase relation between said frame synchronization signal and said wheel index signal;

a clock generator for generating a display master clock signal having a known frequency relation with said wheel index signal;

a frame start signal generator operable to generate a frame start synchronization signal indicating that said display should start displaying the next video frame; and a clock frequency generator circuit for generating an intermediate clock signal with the same frequency as said display master clock signal, and wherein said clock generator comprises a phase locked loop operable to generate said display master clock signal by locking the phase of said intermediate clock signal to the phase of said wheel index signal.

8. The display timing circuit of claim 7, wherein said color wheel synchronization signal generator comprises a divide-by-N counter for dividing a line clock signal derived from said video signal by N where N is the phase difference value.

9. The display timing circuit of claim 7, wherein said phase comparator and said clock generator are programmable, allowing said display timing circuit to be used with different sizes of pixel addressable displays and different types of video signals.

10. The display timing circuit of claim 7, further comprising:
   a sequence controller for executing display sequence instructions in response to said frame start synchronization signal, thereby generating address and timing signals that cause specific segments of an output video frame stored in a display memory to be transferred to said pixel addressable display.

11. The display timing circuit of claim 7, further comprising:
   a sequence controller for executing display sequence instructions in response to said frame start synchronization signal, thereby generating a series of control signals and segment signals, each segment signal denoting a specific portion of an output video frame stored in a display memory to be transferred to said pixel addressable display; and
   a display control signal generator operable to generate display transfer signals upon receipt of said control signals, the display transfer signals controlling said pixel addressable display's receipt of pixel data from said display memory.

12. The display timing circuit of claim 7, further comprising:
   a sequence controller for executing display sequence instructions in response to said frame start synchronization signal, thereby generating a series of control signals and segment signals, each segment signal denoting a specific portion of an output video frame stored in a display memory to be transferred to said pixel addressable display; and
   a frame ram control circuit operable to generate one or more absolute addresses in response to said series of segment signals, the absolute addresses indicating the addresses in said display memory of the pixel data corresponding to the specific portion of the output video frame to be transferred to said pixel addressable display.

13. The display timing circuit of claim 7, further comprising:
   a sequence controller for executing display sequence instructions in response to said frame start synchronization signal, thereby generating a series of control signals and segment signals, each segment signal denoting a specific portion of an output video frame stored in a display memory to be transferred to said pixel addressable display; and
   a timing memory for storing said display sequence instructions.

14. A digital television system having a color wheel to provide colored light to a spatial light modulator and operable to generate a wheel index signal identifying the position of the color wheel, comprising:
   a display memory operable to store output video frame pixel data;
   a spatial light modulator display; and
   a display timing circuit comprising:
      a phase comparator for comparing the phase of said wheel index signal with the phase of a frame synchronization signal indicating that a complete video frame in said video signal is ready to be displayed thereby generating a phase difference value;
      a color wheel synchronization signal generator for generating a color wheel synchronization signal in response to said phase difference value for increasing or decreasing the speed of said color wheel to achieve a known phase relation between said frame synchronization signal and said wheel index signal;
      a clock generator for generating a display master dock signal having a known frequency relation with said wheel index signal and used to control the transfer of output video frame pixel data to said spatial light modulator;
      a frame start signal generator operable to generate a frame start synchronization signal indicating that said spatial light modulator should begin displaying the next video frame; and
      a sequence controller for executing display sequence instructions in response to said frame start synchronization signal thereby generating a series of address and timing signals, said series of address and timing signals capable of causing a specific portion of an output video frame stored in a display memory to be transferred to the pixel addressable display.

15. The digital television system of claim 14, wherein said spatial light modulator comprises a digital micro-mirror device.

* * * * *